(12) United States Patent
Tang

(10) Patent No.: US 9,778,513 B2
(45) Date of Patent: Oct. 3, 2017

(54) LIQUID CRYSTAL DISPLAY PANEL COMPRISING MULTIPLE MAIN PHOTO SPACERS DISPOSED DIRECTLY BELOW A BLACK MATRIX AND MULTIPLE SUB-PHOTO SPACERS DISPOSED BETWEEN THE BLACK MATRIX

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 215 days.

(21) Appl. No.: 14/428,359

(22) PCT Filed: Jan. 13, 2015

(86) PCT No.: PCT/CN2015/070635
§ 371 (c)(1),
(2) Date: Mar. 14, 2015

(87) PCT Pub. No.: WO2016/095302
PCT Pub. Date: Jun. 23, 2016

(65) Prior Publication Data
US 2016/0170252 A1 Jun. 16, 2016

(30) Foreign Application Priority Data
Dec. 15, 2014 (CN) .......................... 2014 1 0779122

(51) Int. Cl.
G02F 1/1339 (2006.01)
G02F 1/1337 (2006.01)
G02F 1/137 (2006.01)

(52) U.S. Cl.
CPC .... G02F 1/13394 (2013.01); G02F 1/133707 (2013.01); *G02F 2001/13396* (2013.01);
(Continued)

(58) Field of Classification Search
CPC . G02F 2001/13398; G02F 2001/13396; G02F 2001/13775
See application file for complete search history.

(56) References Cited

U.S. PATENT DOCUMENTS

2012/0135661 A1* 5/2012 Imanishi .......... G02F 1/133723
445/24
2012/0194494 A1* 8/2012 Jung ................. G02F 1/133723
345/208

(Continued)

*Primary Examiner* — Paul Lee
(74) *Attorney, Agent, or Firm* — Andrew C. Cheng

(57) ABSTRACT

An LCD panel includes a first and a second substrate structure. The second substrate structure includes multiple sub-pixel areas. The first substrate structure has a first substrate, a common electrode layer, an insulation layer, multiple sub-photo spacers, a first conductive film layer and a first alignment film layer. The sub-photo spacers are located above corresponding sub-pixel areas and are separated from the second substrate structure. The first conductive film layer is disposed on the insulation layer and covers the multiple sub-photo spacers. The first alignment film layer covers the first conductive film layer except a portion that covers the sub-photo spacers, and also covers the insulation layer except a portion that is covered by the first conductive film layer. Utilizing the sub-photo spacers to realize a more even alignment of the liquid crystal molecules such that manufacturing process of the liquid crystal panel is simplified, and the cost is reduced.

8 Claims, 2 Drawing Sheets

(52) U.S. Cl.
 CPC .............. *G02F 2001/13398* (2013.01); *G02F 2001/13775* (2013.01)

(56) References Cited

U.S. PATENT DOCUMENTS

2013/0057820 A1\* 3/2013 Hyodo .................. G02F 1/1337
 349/155
2013/0148064 A1\* 6/2013 Shih .......................... B05D 5/06
 349/123
2013/0342798 A1\* 12/2013 Miyake .................. C09K 19/02
 349/132

\* cited by examiner

LIQUID CRYSTAL DISPLAY PANEL COMPRISING MULTIPLE MAIN PHOTO SPACERS DISPOSED DIRECTLY BELOW A BLACK MATRIX AND MULTIPLE SUB-PHOTO SPACERS DISPOSED BETWEEN THE BLACK MATRIX

BACKGROUND OF THE INVENTION

1. Field of the Invention

The present invention relates to a liquid crystal display technology, and more particularly to a multi-domain vertical alignment (MVA) liquid crystal panel.

2. Description of Related Art

With the evolution of the optical and semiconductor technology, the flat panel display is flourishing in development. In various flat panel displays, a liquid crystal display (LCD) has become the mainstream of the market because of many superior characteristics such as high space utilization efficiency, low power consumption, no radiation, and low electromagnetic interference, etc.

In various display modes of the liquid crystal displays, a vertical alignment (VA) liquid crystal display is popular in the market because of good viewing angle feature. For the VA liquid crystal display, long axes of liquid crystal molecules in pixel units are perpendicular to a color filter layer. Each of the pixel units is divided into multiple domains. When a voltage is applied, the liquid crystal molecules in each domain are deflected along a corresponding direction. Through the above way, the liquid crystal molecules of the same pixel unit are divided into multiple directions. Therefore, viewing angles in different directions are compensated in order to achieve an even display in different viewing directions such that viewing angle characters is improved.

In the conventional art, to realize the multiple domains in a pixel unit is by the following way: (1) Patterned vertical alignment (PVA), which is formed by using cracks of pixel electrodes for forming side electric fields. (2) Multi-domain vertical alignment (MVA), which is formed by using protrusion structures in a pixel unit such that liquid crystal molecules form a multi-domain arrangement. However, in the conventional liquid crystal display panel, in order to maintain an interval between two substrates of a liquid crystal panels, two different kinds of spacers are disposed in different areas, wherein, one kind of the spacers is a main spacer, and the other kind of the spacers is a sub-spacer. The main spacer and the sub-spacer are both located on a black matrix. If the above protrusion structures are also disposed in the pixel unit, the structure of the liquid crystal display panel is complicated such that difficulty in manufacturing is increased and production cost is also increased.

SUMMARY OF THE INVENTION

In order to solve the existed problems in the conventional art, one purpose of the present invention is to provide a liquid crystal display panel, comprising: a first substrate structure having a first substrate, a common electrode layer, an insulation layer, multiple sub-photo spacers, a first conductive film layer and a first alignment film layer; a second substrate structure disposed oppositely to the first substrate structure, and having a second substrate and multiple sub-pixel areas formed on the second substrate; wherein, the common electrode layer is disposed on the first substrate; the insulation layer is disposed on the common electrode layer; the multiple sub-photo spacers are disposed on the insulation layer; the multiple sub-photo spacers are located above corresponding sub-pixel areas and are separated from the second substrate structure; the first conductive film layer is disposed on the insulation layer and covers the multiple sub-photo spacers; the first alignment film layer covers the first conductive film layer except a portion of the first conductive film layer that covers each sub-photo spacer; the first alignment film layer also covers the insulation layer except a portion of the insulation layer that is covered by the first conductive film layer.

Wherein, each sub-photo spacer is located above a center portion of a corresponding sub-pixel area.

Wherein, a shape of each sub-photo spacer is a trapezoidal shape.

Wherein, the first substrate structure further includes a black matrix, a color filter layer and multiple main photo spacers, wherein, the black matrix is disposed on the first substrate; the color filter layer is disposed on the black matrix; the common electrode layer is disposed on the color filter layer; the main photo spacers are disposed on the insulation layer; the main photo spacers are disposed below the black matrix and abut upon the second substrate structure.

Wherein, the second substrate structure further includes multiple switching transistors and a second alignment film layer; the multiple switching transistors are arranged on the second substrate as a matrix; pixel electrodes of the switching transistors are disposed in corresponding sub-pixel areas; the second alignment film covers the switching transistors and the sub-pixel areas.

In order to solve the existed problems in the conventional art, another purpose of the present invention is to provide a liquid crystal display panel, comprising: a first substrate structure having a first substrate, a common electrode layer, an insulation layer, multiple conductive sub-photo spacers, a first conductive film layer and a first alignment film layer; a second substrate structure disposed oppositely to the first substrate structure, and having a second substrate and multiple sub-pixel areas formed on the second substrate; wherein, the common electrode layer is disposed on the first substrate; the insulation layer is disposed on the common electrode layer; the multiple conductive sub-photo spacers are disposed on the insulation layer; the multiple conductive sub-photo spacers are located above corresponding sub-pixel areas and are separated from the second substrate structure; the first conductive film layer is disposed on the insulation layer and is contacted with bottom portions of the multiple conductive sub-photo spacers; the first alignment film layer covers the first conductive film layer; the first alignment film layer also covers the insulation layer except a portion of the insulation layer 115 that is covered by the first conductive film layer.

The present invention utilizes sub-photo spacers between the first substrate and the second substrate to realize a more even alignment of the liquid crystal molecules. Comparing to the conventional MVA liquid crystal display panel, no additional protrusions are requirement for realizing the alignment of the liquid crystal molecules. The manufacturing process of the liquid crystal panel is simplified, and the cost is reduced.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures. In the figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

It should be noted that, herein, relational terms such as first and second, and the like are only used to distinguish one entity or operation from another entity or operation. It is not required or implied that these entities or operations exist any such relationship or order between them. Moreover, the terms "comprise," "include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

Figure 1:
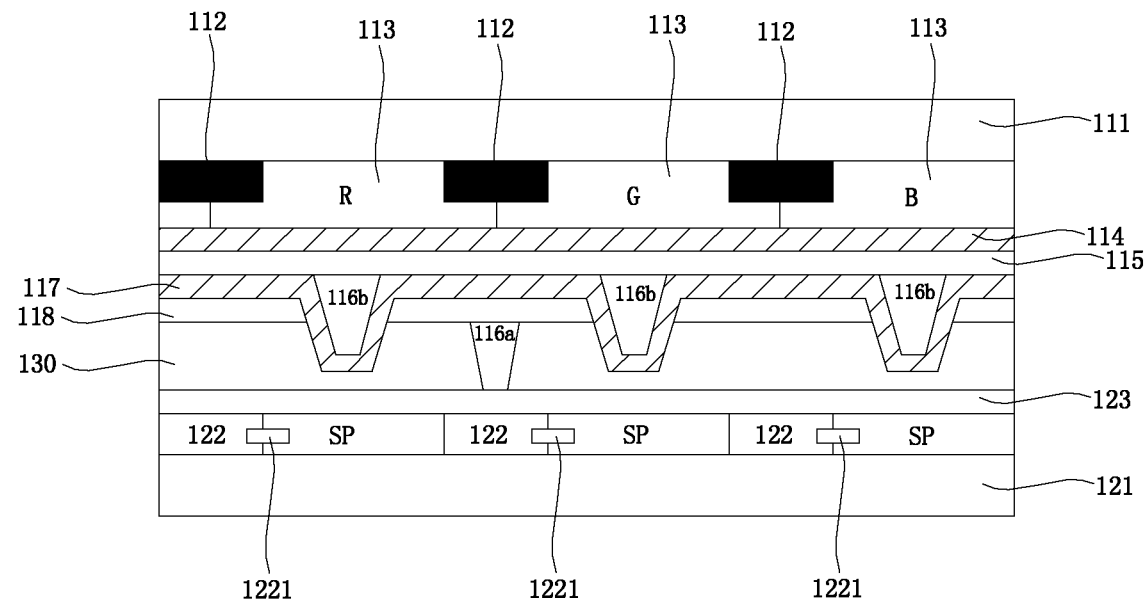
FIG. 1 is a schematic diagram of an MVA liquid crystal display panel according to a first embodiment of the present invention.
Figure 2:
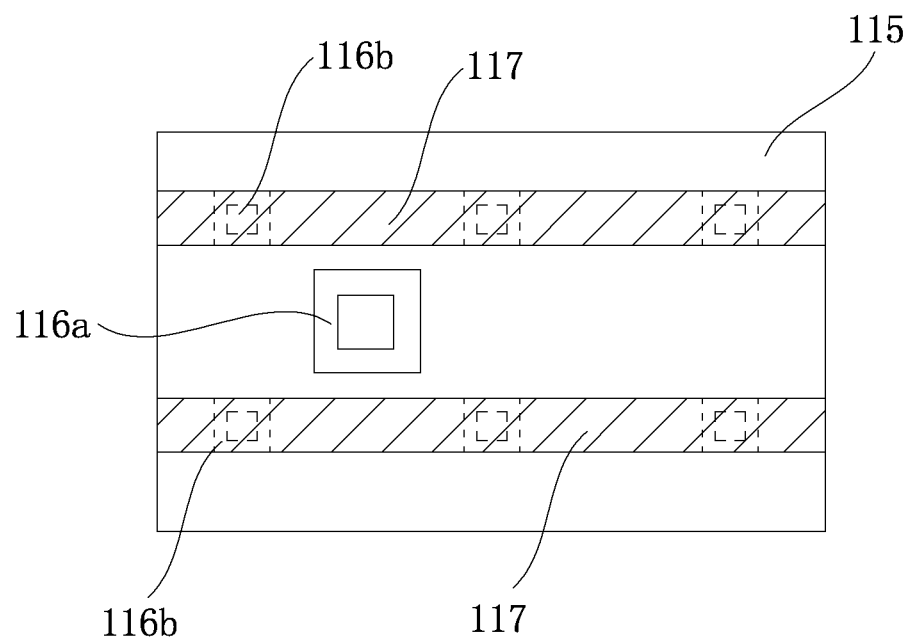
FIG. 2 is a front view of a first substrate according to a first embodiment of the present invention.

FIG. 1 is a schematic diagram of an MVA liquid crystal display panel according to a first embodiment of the present invention and FIG. 2 is a front view of a first substrate according to a first embodiment of the present invention. Wherein, in FIG. 2, a black matrix 112, a color filter layer 113 and a common electrode layer 114 are covered by an insulation layer 115. Besides, in FIG. 2, a first alignment film layer 118 is not shown.

With reference to FIG. 1 and FIG. 2, the multi-domain vertical alignment (MVA) liquid crystal display panel includes a first substrate 111, a second substrate 121 and a liquid crystal layer 130. Wherein, the first substrate 111 and the second sub stare 121 are disposed oppositely. The liquid crystal layer 130 is disposed between the first substrate 111 and the second sub stare 121. Preferably, according to the first embodiment of the present invention, the liquid crystal layer 130 includes negative liquid crystal molecules. However, the present invention is not limited.

A display region of the second sub stare 121 includes multiple sub-pixel areas SP, and the second substrate 121 is provided with multiple switching transistors (such as thin-film transistors) 122. Wherein, a pixel electrode 1221 of each switching transistor 122 is disposed in a corresponding sub-pixel area SP. The second sub stare 121 further is provided with a second alignment film 123. Wherein, the second alignment film 123 covers all of the switching transistors 122 and the sub-pixel areas SP. According to the first embodiment of the present invention, the second alignment film 123 is made of a polyimide resin (PI) material.

The first substrate 111 is provided with: a black matrix 112, a color filter layer 113, a common electrode layer 114, an insulation layer 115, multiple main photo spacers (MPS) 116a, multiple sub-photo spacers (SPS) 116b, a first conductive film layer 117 and a first alignment film layer 118.

The black matrix (BM) 112 is disposed on the first substrate 111. Wherein, the black matrix 112 is made of a black resin or metal chrome. The switching transistors 122 formed on the second substrate 121 are right opposite to the black matrix 112. The color filter layer 113 is formed on the first substrate 111 and covers the black matrix 112. Wherein, the color filter layer 113 includes a red (R) color resist layer, a green (G) color resist layer and a blue (B) color resist layer which are formed sequentially.

The common electrode 114 is formed on the color filter layer 113, wherein, the common electrode layer 114 is made of an indium tin oxide (ITO) material. The insulation layer 115 is formed on the common electrode layer 114. The multiple main photo spacers 116a and the multiple sub-photo spacers 116b are disposed on the insulation layer 115. Therefore, the insulation layer 115 can isolate the common electrode layer 115, the main photo spacers 116a and the sub-photo spacers 116b.

The main photo spacers 116a are located below the black matrix 112 with intervals and the main photo spacers 116a abut the second substrate structure. Wherein, the main photo spacers 116a are used for maintaining an interval between the first substrate structure and the second substrate structure. In the present embodiment, each sub-pixel area SP corresponds to a sub-pixel spacer 116b. An arrangement density of the main photo spacers 116a is smaller than an arrangement density of the sub-photo spacers 116b.

Each sub-photo spacer 116b is located above a corresponding sub-pixel area SP and is separated from the second alignment film 123. Wherein, each sub-photo spacer 116b is made of an elastic material such as a resin or made of a hard material such as silicon dioxide. Preferably, according to the first embodiment of the present invention, each sub-photo spacer 116b is located above a center of the corresponding sub-pixel area SP. Preferably, according to the first embodiment of the present invention, each sub-photo spacer 116b is trapezoidal.

The first conductive film layer 117 is disposed on the insulation layer 115 and covers each sub-photo spacer 116b. Wherein, the first conductive film layer 117 is made of a transparent indium tin oxide (ITO) material. The first alignment film layer 118 covers the first conductive film layer 117 except a portion of the first conductive film layer 117 that covers each sub-photo spacer 116b. The first alignment film layer 118 also covers the insulation layer 115 except a portion of the insulation layer 115 that is covered by the first conductive film layer 117. That is, the first conductive film layer 117 only covers some parts of the insulation layer 115. The first conductive film layer 117 is a narrow and dense electrode pattern such that a shielding effect caused by the first conductive film layer 117 to the common electrode layer 114 is reduced.

Besides, the first alignment film layer 118 does not cover the main photo spacers 116a. The first alignment film layer 118 is made of a polyimide resin (PI) material.

According to the first embodiment of the present invention, firstly, turning on and conducting current to the pixel electrode 1221 of each switching transistor 122 and the first conductive film layer 117. At this time, the negative liquid crystal molecules in the liquid crystal layer 130 will surround the sub-photo spacers 116b and form pre-tilt angles so as to arrange in certain directions. Then, the present embodiment utilizes ultraviolet light (UV) to irradiate such that UV-curable monomers added in the liquid crystal layer 130 perform polymerization reaction so that the liquid crystal molecules are fixed to surround the sub-photo spacers 116*b* in order to form a multi-domain arrangement. As a result, a multi-domain vertical alignment liquid crystal display panel is formed.

Figure 3:
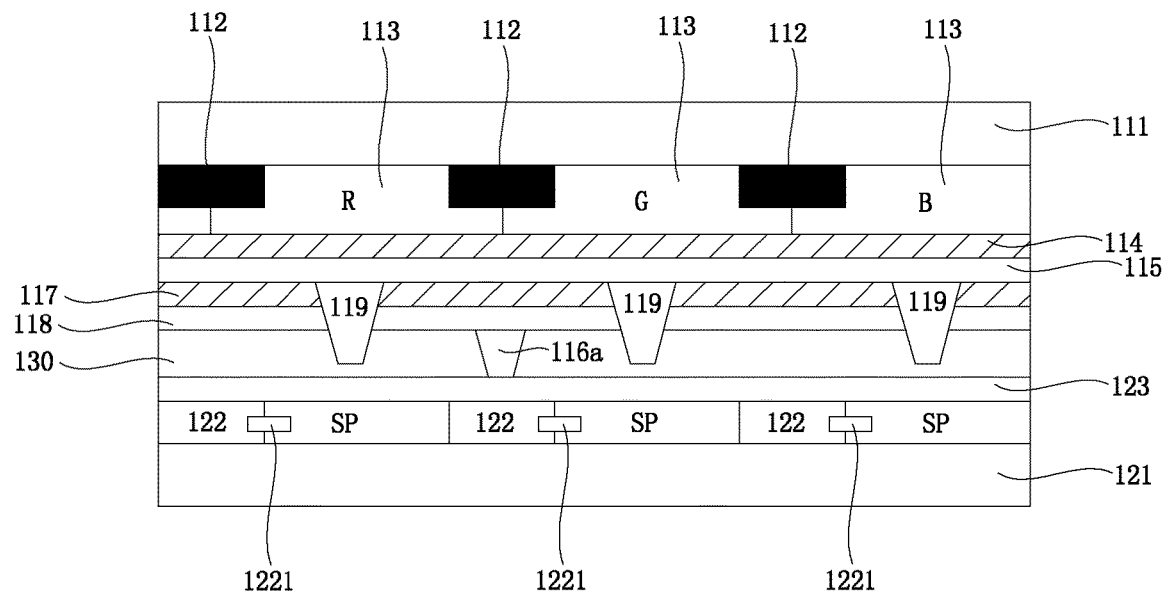
FIG. 3 is a schematic diagram of an MVA liquid crystal display panel according to a second embodiment of the present invention.
Figure 4:
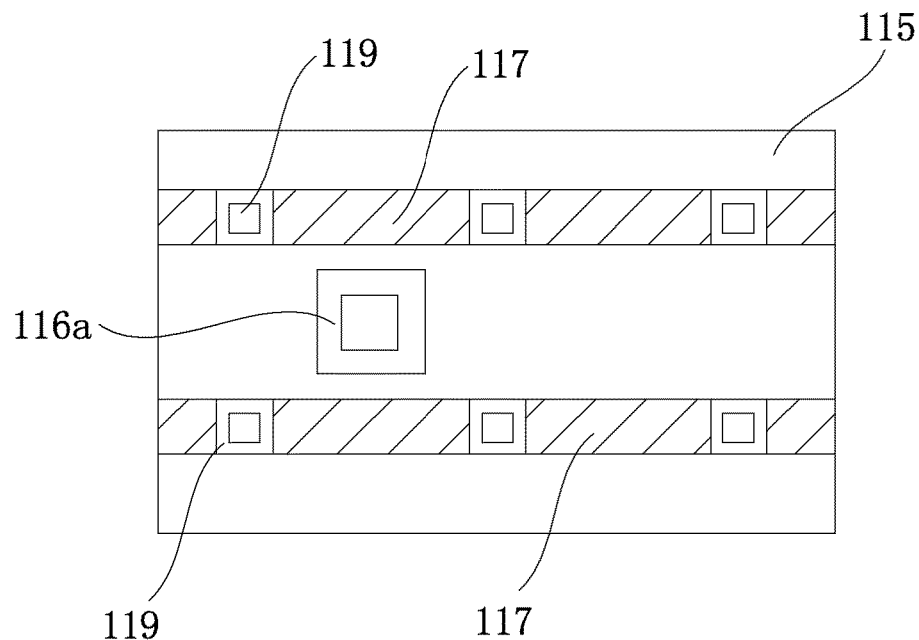
FIG. 4 is a front view of a first substrate according to a second embodiment of the present invention.

FIG. 3 is a schematic diagram of an MVA liquid crystal display panel according to a second embodiment of the present invention, and FIG. 4 is a front view of a first substrate according to a second embodiment of the present invention. Wherein, in FIG. 4, the black matrix 112, the color filter layer 113 and the common electrode layer 114 are covered by the insulation layer 115 and are located below the insulation layer 115. Besides, in FIG. 4, a first alignment film layer 118 is not shown.

With reference to FIG. 3 and FIG. 4, according to the second embodiment, the multi-domain vertical alignment (MVA) liquid crystal display panel includes a first substrate 111, a second substrate 121 and a liquid crystal layer 130. Wherein, the first substrate 111 and the second substrate 121 are disposed oppositely. The liquid crystal layer 130 is disposed between the first substrate 111 and the second substrate 121. Preferably, according to the second embodiment of the present invention, the liquid crystal layer 130 includes negative liquid crystal molecules. However, the present invention is not limited.

A display region of the second substrate 121 includes multiple sub-pixel areas SP, and the second substrate 121 is provided with multiple switching transistors (such as thin-film transistors) 122. Wherein, a pixel electrode 1221 of each switching transistor 122 is disposed in a corresponding sub-pixel area SP. The second substrate 121 further is provided with a second alignment film 123. Wherein, the second alignment film 123 totally covers all of the switching transistors 122 and the sub-pixel areas SP. According to the second embodiment of the present invention, the second alignment film 123 is made of a polyimide resin (PI) material.

The first substrate 111 is provided with: a black matrix 112, a color filter layer 113, a common electrode layer 114, an insulation layer 115, multiple main photo spacers 116*a*, multiple conductive sub-photo spacers 119, a first conductive film layer 117 and a first alignment film layer 118.

The black matrix (BM) 112 is disposed on the first substrate 111. Wherein, the black matrix 112 is made of a black resin or metal chrome. The switching transistors 122 formed on the second substrate 121 are right opposite to the black matrix 112. The color filter layer 113 is formed on the first substrate 111 and covers the black matrix 112. Wherein, the color filter layer 113 includes a red (R) color resist layer, a green (G) color resist layer and a blue (B) color resist layer which are formed sequentially.

The common electrode 114 is formed on the color filter layer 113, wherein, the common electrode layer 114 is made of an indium tin oxide (ITO) material. The insulation layer 115 is formed on the common electrode layer 114. The multiple main photo spacers 116*a* and the conductive sub-spacers 119 are disposed on the insulation layer 115. Therefore, the insulation layer 115 can isolate the common electrode layer 115, the main photo spacers 116*a* and the conductive sub-photo spacers 119.

The main photo spacers 116*a* are located below the black matrix 112 with intervals and the main photo spacers 116*a* abut the second substrate structure. Wherein, the main photo spacers 116*a* are used for maintaining an interval between the first substrate structure and the second substrate structure. In the present embodiment, each sub-pixel area SP corresponds to a conductive sub-photo spacer 119. An arrangement density of the main photo spacers 116*a* is smaller than an arrangement density of the conductive sub-photo spacers 119.

Each conductive sub-photo spacer 119 is located above a corresponding sub-pixel area SP and is separated from the second alignment film layer 123. Wherein, each conductive sub-photo spacer 119 is made of a metal material such as aluminum. Preferably, according to the second embodiment of the present invention, each conductive sub-photo spacer 119 is located above a center of the corresponding sub-pixel area SP. Preferably, according to the second embodiment of the present invention, each conductive sub-photo spacer 119 is trapezoidal.

The first conductive film layer 117 is disposed on the insulation layer 115. The first conductive film layer 117 also contacts with a bottom portion of each conductive sub-photo spacer 119. Wherein, the first conductive film layer 117 is made of a transparent indium tin oxide (ITO) material. The first alignment film layer 118 covers the first conductive film layer 117. The first alignment film layer 118 also covers the insulation layer 115 except a portion of the insulation layer 115 that is covered by the first conductive film layer 117. That is, the first conductive film layer 117 only covers some parts of the insulation layer 115. The first conductive film layer 117 is a narrow and dense electrode pattern such that a shielding effect caused by the first conductive film layer 117 to the common electrode layer 114 is reduced.

Besides, the first alignment film layer 118 does not cover the main photo spacers 116*a*. The first alignment film layer 118 is made of a polyimide resin (PI) material.

According to the second embodiment of the present invention, firstly, turning on and conducting current to the pixel electrode 1221 of each switching transistor 122 and the first conductive film layer 117. In the second embodiment, because the first conductive film layer 117 is contacted with the bottom portion of each conductive sub-photo spacer 119, each conductive sub-photo spacer 119 is also conductive by a voltage. At this time, the negative liquid crystal molecules in the liquid crystal layer 130 will surround the conductive sub-photo spacers 119 and form pre-tilt angles so as to arrange in certain directions. Then, the present embodiment utilizes ultraviolet light (UV) to irradiate such that UV-curable monomers added in the liquid crystal layer 130 perform polymerization reaction so that the liquid crystal molecules are fixed to surround the conductive sub-photo spacers 119 in order to form a multi-domain arrangement. As a result, a multi-domain vertical alignment liquid crystal display panel is formed.

In summary, according to the embodiments of the present invention, the present invention utilizes sub-photo spacers between the first substrate and the second substrate to realize a more even alignment of the liquid crystal molecules. Comparing to the conventional MVA liquid crystal display panel, no additional protrusions are requirement for realizing the alignment of the liquid crystal molecules. The manufacturing process of the liquid crystal panel is simplified, and the cost is reduced.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display panel, comprising:
a first substrate structure having a first substrate, a black matrix, a common electrode layer, an insulation layer, multiple main photo spacers and multiple sub-photo spacers, a first conductive film layer, and a first alignment film layer; and
a second substrate structure disposed oppositely to the first substrate structure, and having a second substrate and multiple sub-pixel areas formed on the second substrate;
wherein, the common electrode layer is disposed on the first substrate; the insulation layer is disposed on the common electrode layer; the multiple sub-photo spacers are disposed on the insulation layer; the multiple sub-photo spacers are located above corresponding sub-pixel areas and are separated from the second substrate structure; the first conductive film layer is disposed on the insulation layer and covers the multiple sub-photo spacers; the first alignment film layer covers the first conductive film layer except a portion of the first conductive film layer that covers each sub-photo spacer; the first alignment film layer also covers the insulation layer except a portion of the insulation layer that is covered by the first conductive film layer;
wherein, the multiple main photo spacers are disposed on the first alignment film layer, and the main photo spacers are disposed directly below the black matrix and abut upon the second substrate structure;
wherein, each of the multiple sub-photo spacers is disposed between the black matrix; and
wherein, the common electrode layer and first conductive film layer are separated by the insulation layer.

2. The liquid crystal display panel according to claim 1, wherein, each of the multiple sub-photo spacer is located above a center portion of a corresponding sub-pixel area.

3. The liquid crystal display panel according to claim 1, wherein, a shape of each of the multiple sub-photo spacer is a trapezoidal shape.

4. The liquid crystal display panel according to claim 2, wherein, a shape of each of the multiple sub-photo spacer is a trapezoidal shape.

5. The liquid crystal display panel according to claim 1, wherein, the first substrate structure further includes a color filter layer, wherein, the black matrix is disposed on the first substrate; the color filter layer is disposed on the black matrix; the common electrode layer is disposed on the color filter layer.

6. The liquid crystal display panel according to claim 2, wherein, the first substrate structure further includes a color filter layer, wherein, the black matrix is disposed on the first substrate; the color filter layer is disposed on the black matrix; the common electrode layer is disposed on the color filter layer.

7. The liquid crystal display panel according to claim 1, wherein, the second substrate structure further includes multiple switching transistors and a second alignment film layer; the multiple switching transistors are arranged on the second substrate as a matrix; pixel electrodes of the switching transistors are disposed in corresponding sub-pixel areas; the second alignment film covers the switching transistors and the sub-pixel areas.

8. The liquid crystal display panel according to claim 2, wherein, the second substrate structure further includes multiple switching transistors and a second alignment film layer; the multiple switching transistors are arranged on the second substrate as a matrix; pixel electrodes of the switching transistors are disposed in corresponding sub-pixel areas; the second alignment film covers the switching transistors and the sub-pixel areas.

* * * * *